July 17, 1934.　　　　J. T. DALTON　　　　1,967,203
BAG CLOSING MACHINE
Filed Aug. 11, 1933　　　8 Sheets-Sheet 2
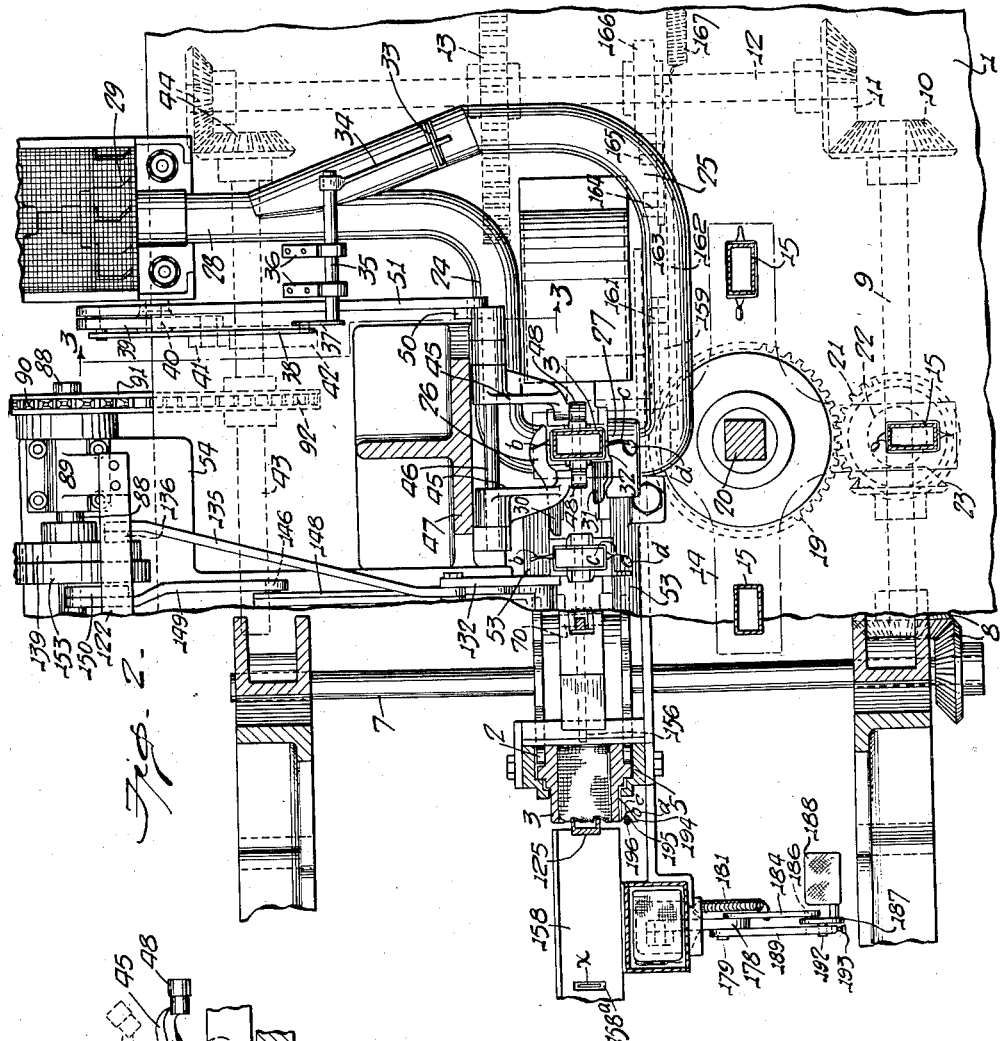
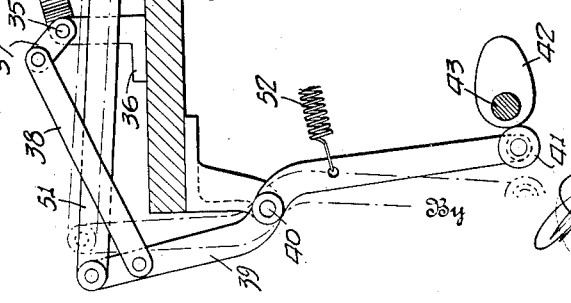
Inventor
John T. Dalton
By
Attorney Inventor
John T. Dalton
By James L. Norris
Attorney July 17, 1934.  J. T. DALTON  1,967,203
BAG CLOSING MACHINE
Filed Aug. 11, 1933   8 Sheets-Sheet 4
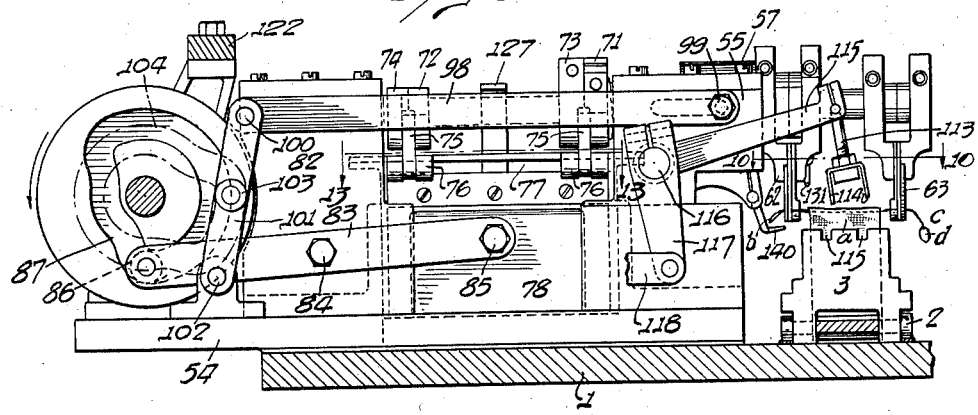
Fig. 6.
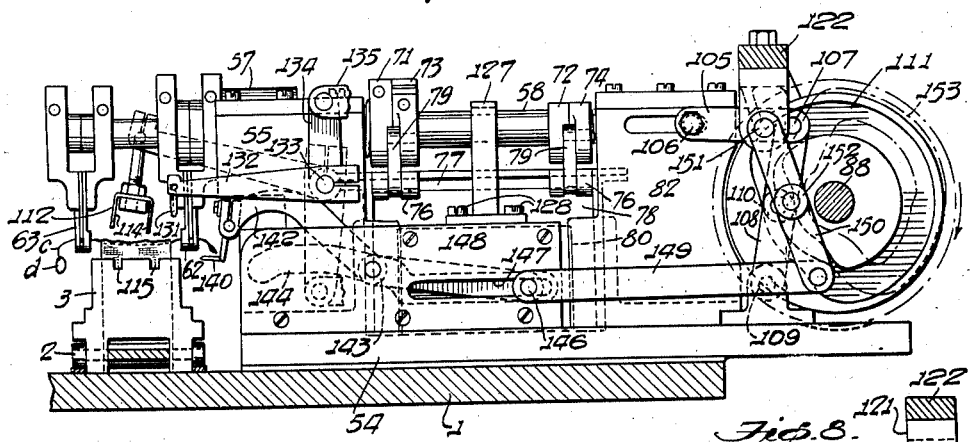
Fig. 7.
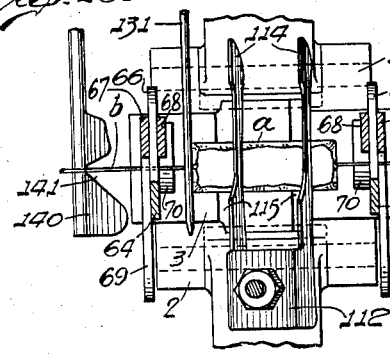
Fig. 10.
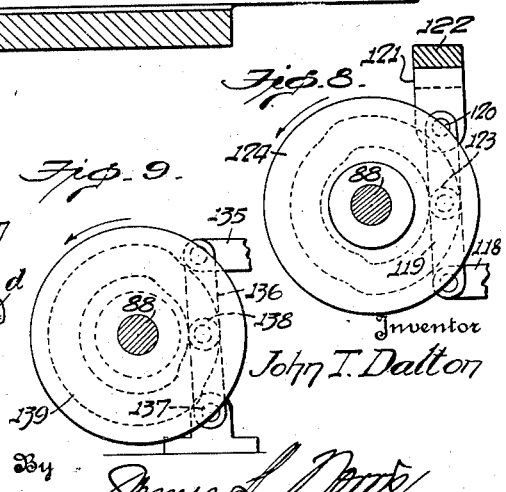
Fig. 8.
Fig. 9.
Inventor
John T. Dalton
By
James L. Norris
Attorney

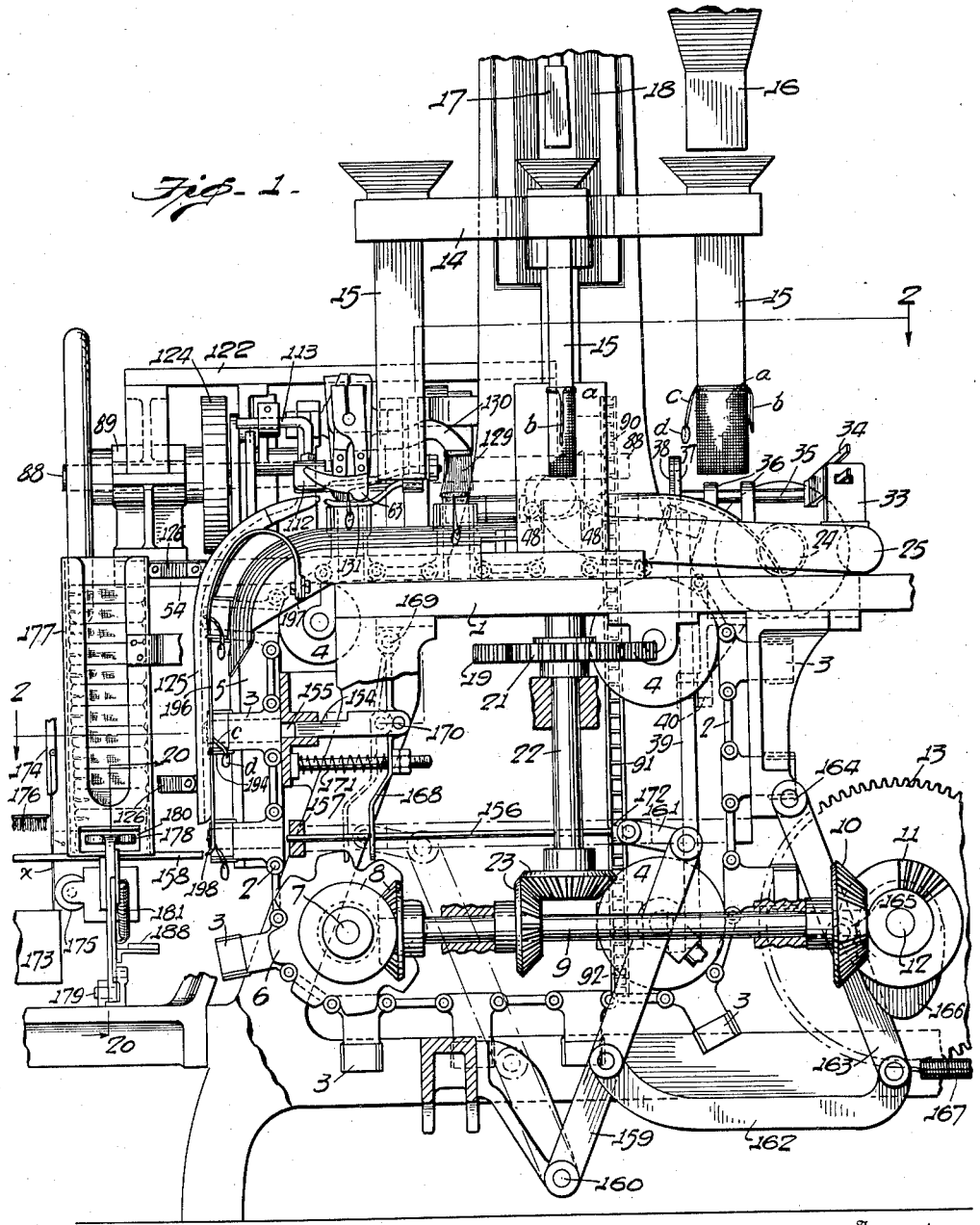

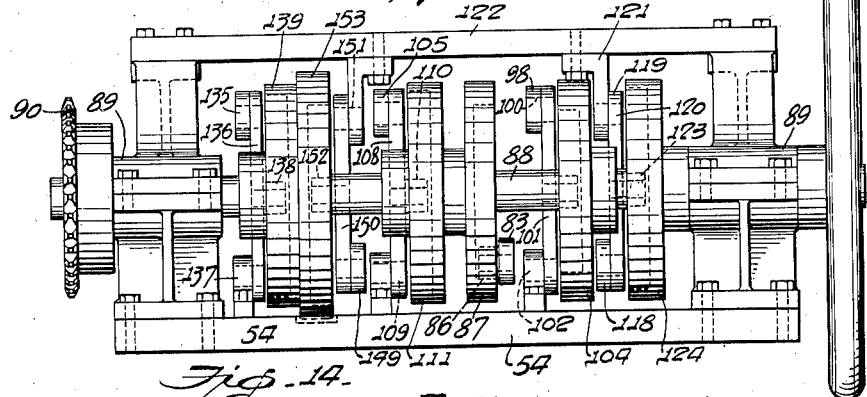
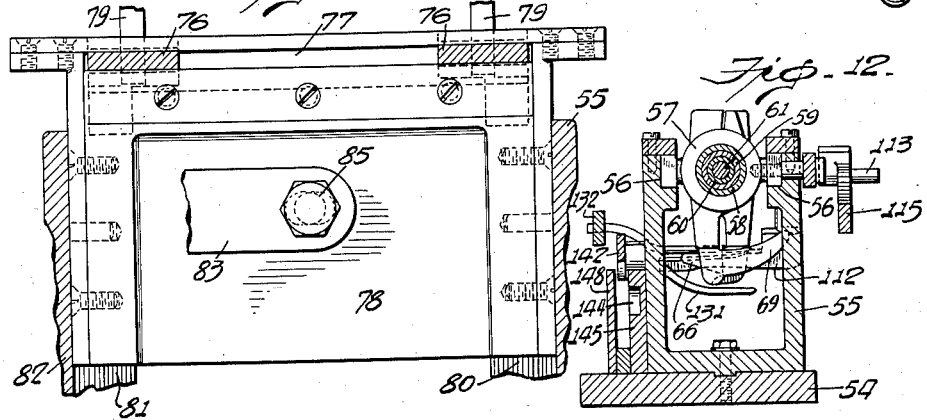
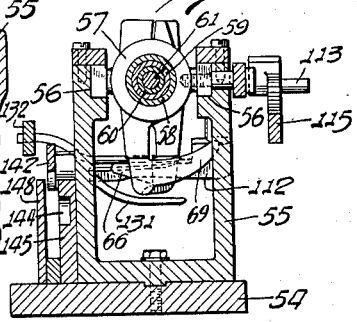
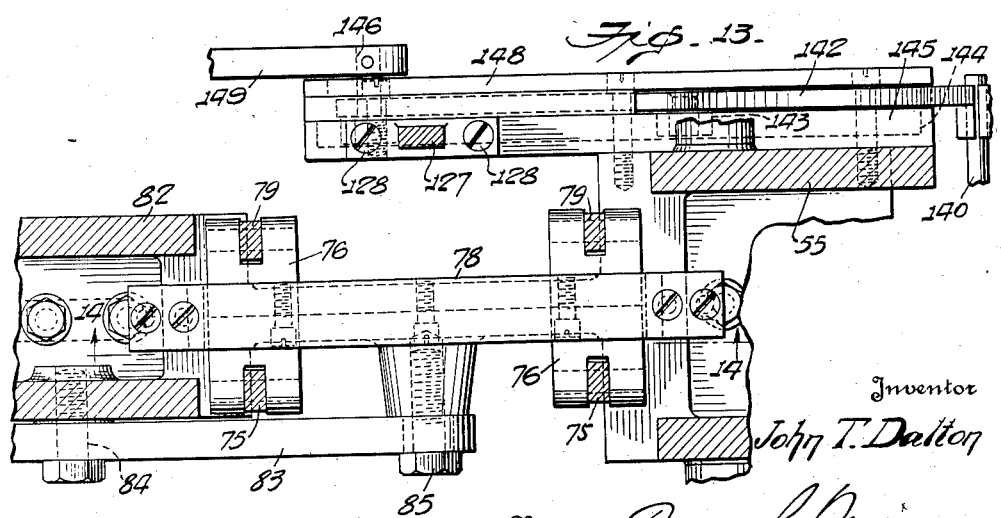

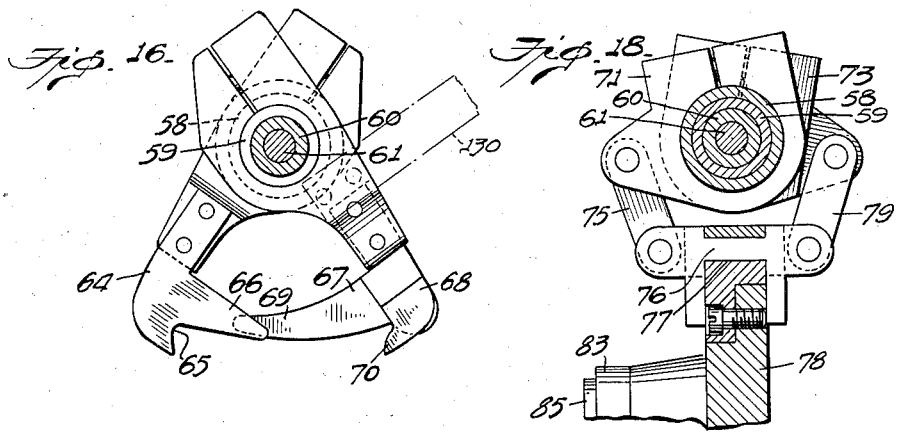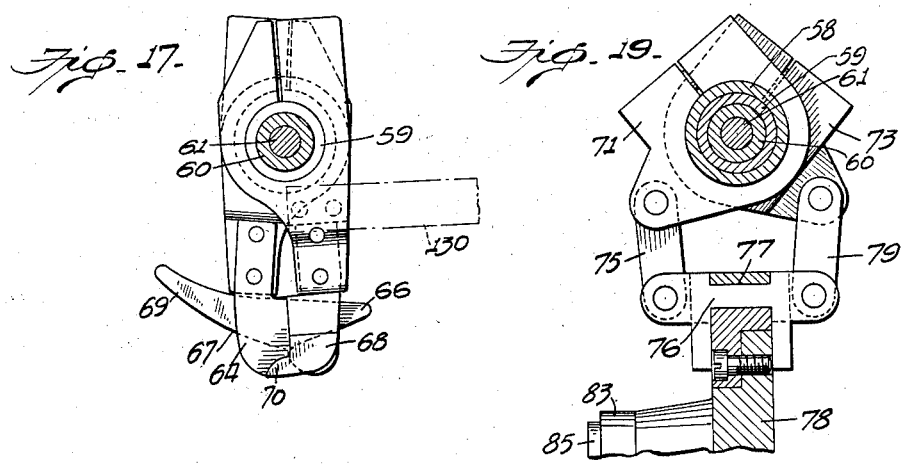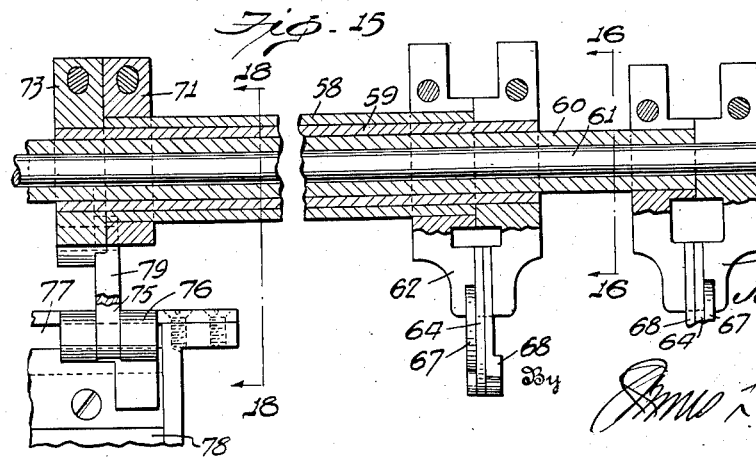

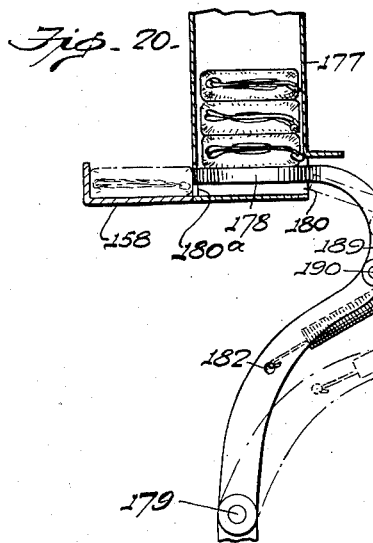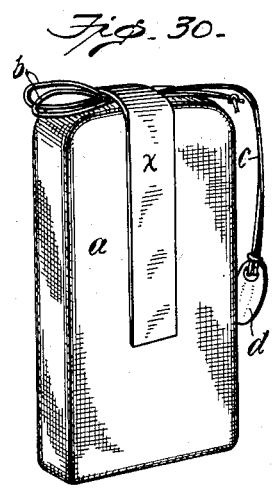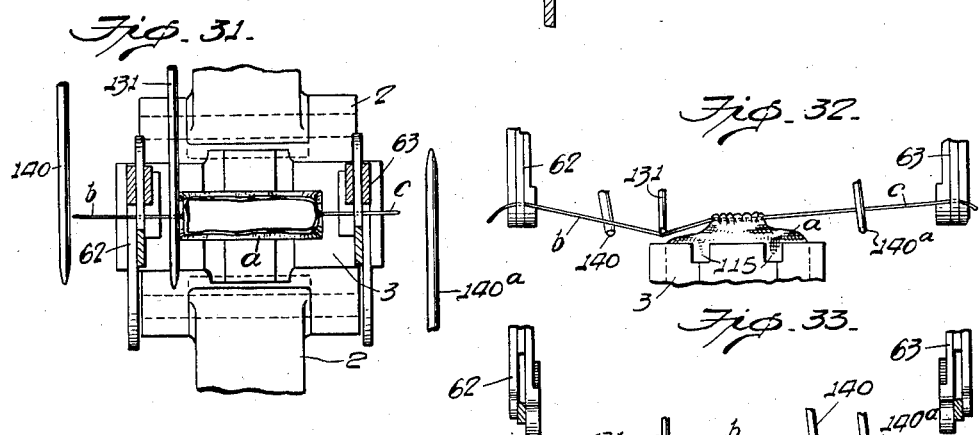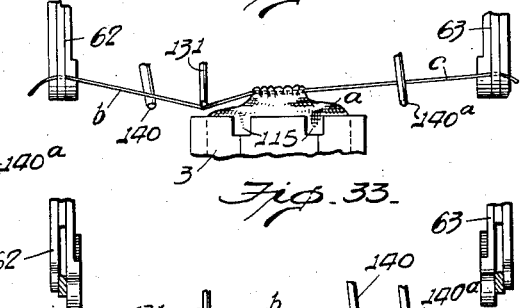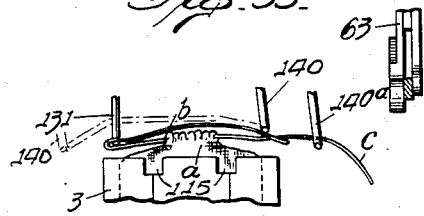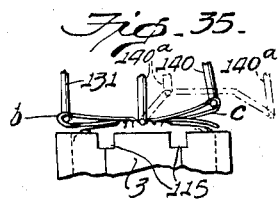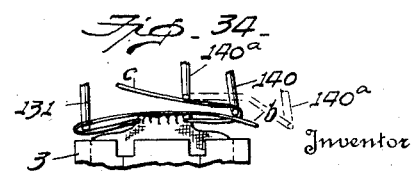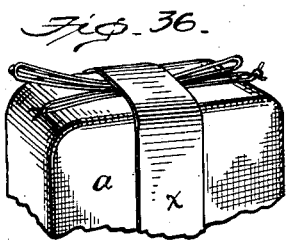

July 17, 1934. J. T. DALTON 1,967,203
BAG CLOSING MACHINE
Filed Aug. 11, 1933 8 Sheets-Sheet 8
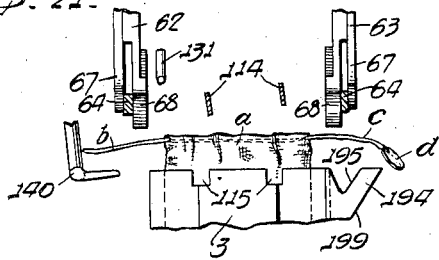
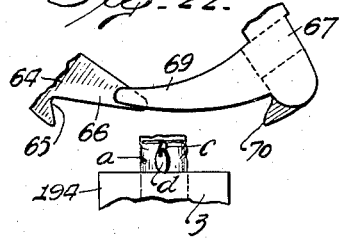
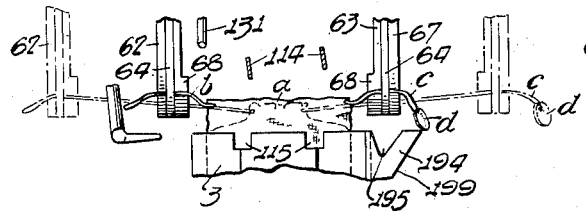
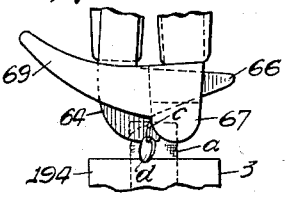
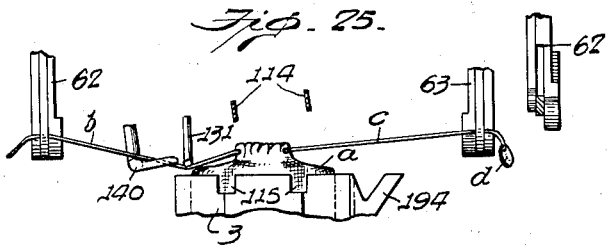
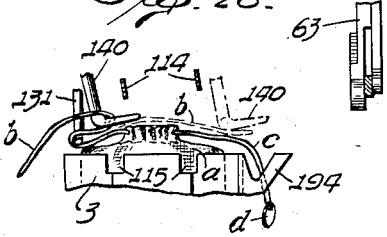
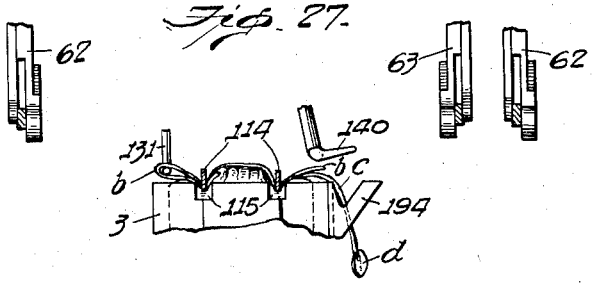
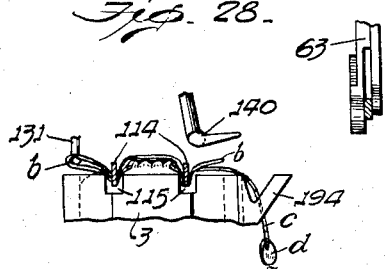
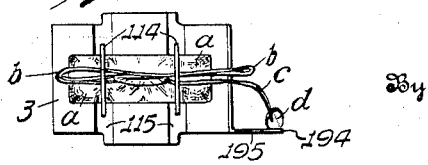
Inventor
John T. Dalton
By
Attorney Patented July 17, 1934

1,967,203

UNITED STATES PATENT OFFICE 1,967,203

BAG CLOSING MACHINE

John T. Dalton, Durham, N. C., assignor to Wright-Dalton Machinery Company, Durham, N. C., a corporation of North Carolina Application August 11, 1933, Serial No. 685,621

24 Claims. (Cl. 226—56)

The present invention relates to improvements in machines for handling bags such as tobacco bags having draw strings at the mouths for closing them, and the primary object of the invention is to provide means for drawing the strings of such bags to close the mouths thereof and of laying or folding one or both of the strings of each bag across the closed mouth thereof so that the folded string or strings will be held against displacement from the top of the bag by a revenue stamp or the like when pasted across the bag mouth, such means being operative automatically upon the bags as they are advanced successively, as in a bag filling and packing machine.

Further and more particular objects of the invention are to provide novel means for disposing the strings of the bags so that they may be grasped readily and with certainty by string drawing means, to provide relatively simple and effective means for grasping and drawing the strings taut and thereby close the bags, to provide means for folding at least one of the strings across the closed top of each bag, to provide means for effectively holding the folded string in place on the top of each bag to prevent displacement thereof until a securing stamp or the like is applied across the top of the bag to permanently secure such string, and to provide simple and effective means for supplying a bag to the machine for stamping in place of a missing bag.

To these and other ends, the invention consists in certain improvements and combinations and arrangements of parts as will be hereinafter more fully described, the features of novelty being pointed out more particularly in the claims at the end of this specification.

In the accompanying drawings:

Figure 1 is an elevation, partly in section, of a bag filling, packing and stamping machine to which the present invention is applied;

Figure 2 is a horizontal section taken on the line 2—2 of Figure 1;

Figure 3 is a detail vertical section, taken on the line 3—3 of Figure 2, showing the controlling valve and its operating connections for the string positioning suction means;

Figure 6 is a vertical section taken on the line 6—6 of Figure 4 and looking in the direction of the arrows;

Figure 7 is a vertical section taken on the line 7—7 of Figure 4 and looking in the direction of the arrows;

Figure 8 is a detail vertical section taken on the line 8—8 of Figure 4, showing the cam for operating the folded string pressing member;

Figure 9 is a detail vertical section taken on the line 9—9 in Figure 4, showing the cam for operating the member about which the string is folded;

Figure 10 is a horizontal section, on an enlarged scale, taken on the line 10—10 in Figure 6 and showing the bag string drawing, folding and holding members in relation to a bag in one of the bag holders;

Figure 11 is an elevation of the structure shown in Figure 4 as viewed from the left in said figure;

Figure 12 is a vertical section taken on the line 12—12 in Figure 4 and looking in the direction of the arrows;

Figure 13 is a horizontal section on an enlarged scale taken on the line 13—13 in Figure 6;

Figure 14 is a vertical section taken on the line 14—14 in Figure 13;

Figure 15 is a vertical section on an enlarged scale and taken on the line 15—15 in Figure 4, with portions omitted;

Figure 16 is a vertical section taken on the line 16—16 in Figure 15 showing members of one of the bag string grippers in open relation;

Figure 17 is a view similar to Figure 16 but showing the members of the gripper in closed or string gripping relation;

Figure 18 is a vertical section taken on the line 18—18 in Figure 15, showing the operating means for the members of one of the string grippers in position to hold the gripper members open;

Figure 19 is a view similar to Figure 18 but showing the gripper operating means in position to close the gripper members;

Figure 20 is a vertical section through the means for supplying a bag in place of a missing one, the section being taken on the line 20—20 in Figure 1 and being on an enlarged scale;

Figure 21 is a diagrammatic view showing the grippers in position to grip the strings projecting from opposite sides of a bag;

Figure 22 is a side elevation of the structure shown in Figure 21 as viewed from the right;

Figure 23 is a view similar to Figure 21 but showing the grippers in full lines after gripping the bag strings and in dotted lines after drawing the bag strings to close the bag mouth;

Figure 24 is a side elevation of the structure shown in Figure 23 as viewed from the right;

Figures 25, 26, 27 and 28 are diagrammatic views showing successive steps in the operations of folding one of the bag strings over the closed bag mouth and of holding the folded string in place on the bag;

Figure 29 is a top plan of the bag holder and the bag therein, showing the bag string held in folded condition on the top of the bag;

Figure 30 is a perspective view of the filled and closed bag as delivered from the machine, showing one of the bag strings folded across the top of the bag and a stamp applied across the top of the bag and holding the folded string to prevent displacement thereof;

Figure 31 is a view similar to Figure 10 but showing a modification whereby both of the draw strings of the bag are folded across the top thereof;

Figures 32, 33, 34 and 35 are diagrammatic views showing successive steps in the folding of both bag strings across the top of the bag and holding them in folded condition; and Figure 36 is a perspective view of the upper end of the filled and closed bag having a stamp applied thereto and holding the folded bag strings to prevent displacement thereof.

Similar parts are designated by the same reference characters in the different figures.

Figure 4:
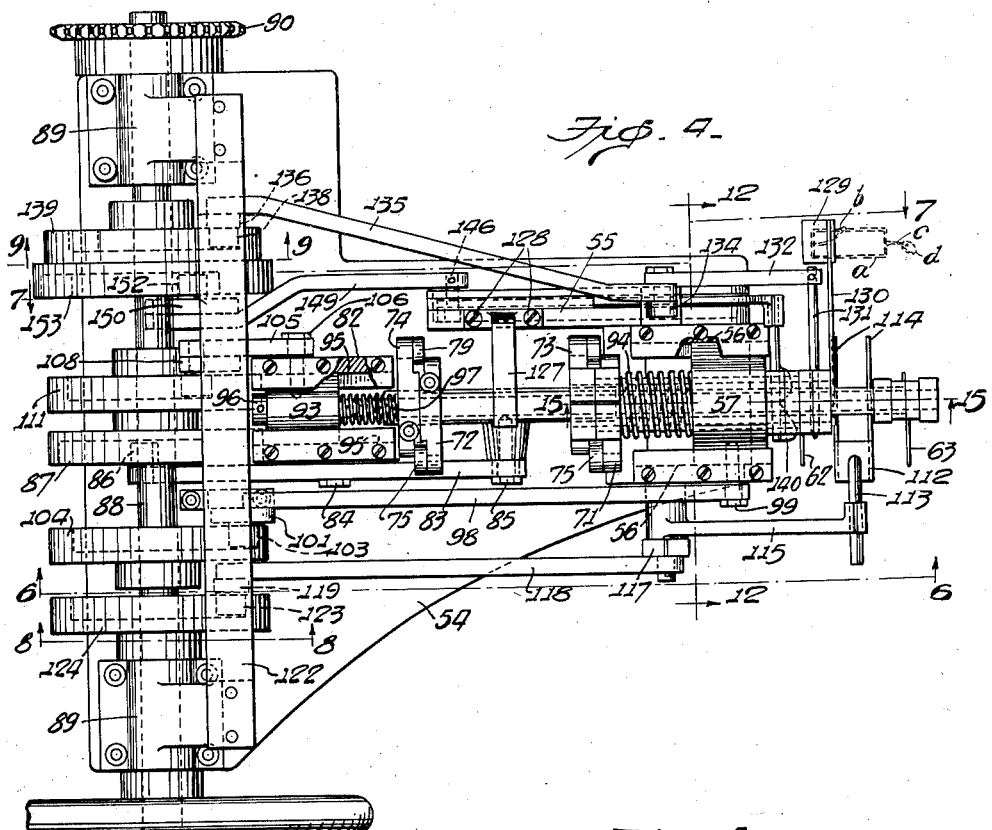
Figure 4 is a top plan view of the bag string drawing, folding and holding means, the parts being shown in the position to commence operations upon the strings of a bag.

The present invention may be embodied in or applied as an attachment to machines of different kinds for filling and closing bags, such as tobacco bags and the like having draw strings contained in hems surrounding the bag mouths. The preferred embodiments of the invention are shown in the accompanying drawings and will be hereinafter described in detail, but it is to be understood that the invention is not restricted to the precise constructions shown since equivalent constructions are contemplated and such will be included within the scope of the claims.

In the present instance, the invention is shown applied to a bag filling and packing machine of a well-known construction substantially as shown and described in Letters Patent No. 829,288, granted August 21, 1906, to which reference may be had for a detailed disclosure of such machine, it being deemed sufficient for the purposes of the present invention to describe such bag filling and packing machine as comprising a main frame which provides a table 1 on or above which most of the operating elements of the machine are located, the machine embodying a chain or similar flexible conveyer 2 which carries a series of bag holders 3, the conveyer being guided by idler pulleys 4 to pass over the top of the table to bring the bag holders thereon successively into positions to receive the bags and for operation upon the strings thereof to close and secure the bag mouths, following which the bag holders on the conveyer are guided downwardly through a guideway 5 past a position where the bags are compressed to flatten the tops thereof and to a position from which the bags are ejected from the bag holders and advanced to a stamp applying device. The conveyer carrying the bag holders is advanced intermittently or step by step to bring each bag holder successively into the different positions stated, by a sprocket wheel 6 over which the conveyer passes, this sprocket wheel being fixed on a shaft 7 which is mounted in the main frame and is driven through bevel gears 8 from a shaft 9, the latter being rotated intermittently and to the proper extent at each operation through interrupted gears 10 and 11, the gear 10 being fixed on the shaft 9 and having the gear teeth thereon interrupted for example at four points spaced equally around its circumference and the gear 11 the teeth of which are adapted to mesh successively with the gear segments on the gear 10, during successive revolutions of the gear 11, being fixed to a continuously rotating drive shaft 12, the latter being driven from any suitable source of power through a driving gear 13 or any equivalent means.

The means for filling the bags and introducing them successively into the bag holders on the conveyer and for packing the tobacco or other material in the bags comprises a head 14 having arms, four in the present instance, projecting radially therefrom, each of these arms carrying a vertical filling tube or funnel 15 which is adapted to receive an empty bag at its lower end and to hold the bag thereon, the bags being usually applied to these tubes manually by an attendant, and the upper end of each filling tube or funnel 15 is open and adapted to receive a charge of material, such as tobacco, to fill the bag, from a chute or hopper 16 when the head is rotated into a position to bring the respective filling tube or hopper therebeneath, the chute or hopper 16 receiving the material from any suitable supply means. The path in which the filling tubes 15 rotate brings them above the holders on the conveyer, and a packing plunger 17 is mounted to reciprocate vertically on a guideway 18 on the machine frame in a path which will carry it downwardly through each filling tube 15 as the same is brought into position beneath the plunger and above a bag holder on the conveyer. The head 14 carrying the filling tubes 15 is rotatable intermittently and in synchronism with the intermittent advancing movements of the conveyer carrying the bag holder and is timed to bring a filling tube thereon into position immediately above a bag holder on the conveyer each time a bag holder is brought into receiving position, the head 14 being intermittently rotated to accomplish this result by a gear 19 connected to the vertical shaft 20 to the upper end of which the head 14 is fixed, the gear 19 meshing with a gear 21 fixed on a vertical shaft 22 suitably journalled in the machine frame and the shaft 22 being connected by bevel gears 23 to the intermittently rotating shaft 9 which drives the conveyer, the gearing being so proportioned that the head 14 will make one-quarter revolution each time the conveyer advances to bring another bag holder thereon into bag receiving position. The head 14 is also reciprocable vertically during each pause in its rotation to carry the filled bag on the filling tube 15 thereof which is brought into position above a bag holder on the conveyer which is in filling position, downwardly into such bag holder, following which the plunger 17 descends through the filling tube and presses on the material filling the bag and thereby holds the bag in the holder on the conveyer while the head 14 is lifted or returned to its normal elevation, the filling tube being thereby withdrawn from the bag holder on the conveyer and being brought to an elevation which will permit rotation of the head without interference from the conveyer or the bag holders thereon. The means for thus lowering and raising the head 14 may be like that shown and described in the patent hereinbefore mentioned. It will be understood that after the head 14 has been lifted to transfer the bag from a filling tube thereon to the bag holder on the conveyer, the packing plunger 17 rises into substantially the position shown in Figure 1, it then clearing the filling tubes on the head 14 so that the latter may rotate without interference from the plunger, and the packing plunger may be lowered and raised at the appropriate times by means such as that disclosed in the patent hereinbefore referred to.

The bags used for packing tobacco and to which the present invention is particularly applicable each comprise a body $a$ composed of muslin or other fabric having a hem at the upper end or mouth which contains a pair of draw strings $b$ and $c$ which, when pulled or drawn taut from opposite sides of the bag, pucker and thereby close the bag mouth, and one of these strings, such as the string $c$ in the present instance, may have a tag $d$ threaded on or otherwise attached thereto, such tags being used to contain advertising or other printed matter thereon.

In the operation of a bag filling and packing machine of the class referred to, the empty bags are successively slipped upon the lower ends of the filling tubes 15 so that the strings $b$ and $c$ lie at opposite sides of the respective filling tubes, and the successive rotations of the head 14 carry the filling tubes and the bags thereon first beneath the filling chute or hopper 16 where each bag receives its charge of material and to position beneath the packing plunger 17, and the conveyer advances concurrently to bring the bag holders thereon successively beneath the filling tubes when positioned below the plunger 17, the following descent of the head 14 carrying the filled bag beneath the plunger 17 downwardly into the bag holder beneath it following which the plunger 17 descends and packs the material tightly in the bag in the bag holder and holds the bag in the holder while the head 14 rises to withdraw the filling tube 15 from the bag and bag holder, the following ascent of the plunger 17 withdrawing it from the bag and from the filling tube and clearing the latter so that the head 14 may rotate to bring the next succeeding filling tube and bag into position to transfer its bag to the next following bag holder on the conveyer.

In applying the present invention to a bag filling and packing machine substantially as hereinbefore described, a pair of air suction ducts 24 and 25 are provided, these ducts having mouths 26 and 27 which are located at opposite sides of each bag holder 3 while the same occupies bag receiving position, and the ducts 24 and 25 both communicate with an inlet pipe 28 which leads to an air exhausting fan or other suitable form of suction device 29. The partial vacuum or suction produced in the ducts 24 and 25 causes air currents to enter the mouths 26 and 27 thereof and these air currents act to draw the strings $b$ and $c$ outwardly or in opposite directions from the respective sides of the bag in the bag holder. The mouths 26 and 27 for the suction ducts are provided with shelf-like guards 30 and 31 which serve as supports on which the extended bag strings may rest, these guards extending for a suitable distance in the direction of advance of the conveyer, and a supplemental guard 32 is provided adjacent to the duct mouth 27 to form an abutment against which the tag $d$ may strike as the respective bag is swung into position above the bag holder and thereby prevent displacement of the tag. Preferably, the air suction through the duct 25 is cut off or interrupted periodically so that the suction takes place only during the period each bag is in transfer position, the means for so controlling the air suction comprising in the present instance a valve 33 operating vertically in the duct 25 and controlling the flow of air therethrough. This valve is operated by an arm 34 fixed to a rock shaft 35, the latter being mounted in a bracket 36 fixed to the frame of the machine and provided with an operating arm 37 connected by a link 38 to a lever 39, the latter being pivoted on the frame of the machine at 40 and carrying a roller 41 which cooperates with a cam 42 fixed on a shaft 43, the latter being driven continuously from the main shaft 12 through bevel gears 44. The lever 39 and cam 42 are preferably parts of means employed for accurately positioning each bag holder in transfer position, the bag holder positioning means comprising a pair of arms 45 fixed to a rock shaft 46 journalled in bearings on a bracket 47, the arms 45 carrying at their ends rollers 48 which are spaced apart the proper distance to straddle each bag holder on the conveyer and these rollers being adapted to bear on surface 49 at the front and rear sides of the bag holders. The rock shaft 46 has a crank 50 fixed thereto and this crank is operatively connected by a link 51 to the upper end of the lever 39. A spring 52 acts to hold the roller 41 in contact with the cam 42, and it urges the lever 39 in a direction to lower the bag holder positioning arms 45 and to lift or open the suction control valve 33, as shown by the full lines in Figure 3, the rollers 48 then acting on a bag holder that has been brought into bag receiving position by the conveyer to center or accurately position this bag holder beneath the filling tube 15, and the open position of the valve 33 at this time will produce air suction at the mouth 27 which will act to draw the bag string $c$ and tag $d$ away from the respective side of the bag so that it will overlie the guard 31, as shown in Figure 2, and air suction which may continue uninterruptedly through the duct 24 and may serve to remove any tobacco or material that may spill during the bag transferring and packing operation, will act to draw the bag string $b$ away from that side of the bag and to overlie the respective guard 30, as shown in Figure 2. After completion of the bag transferring and packing operations, the cam 42 reaches a position which brings the lever 39 into the dotted line position shown in Figure 3, thereby lifting the rollers 48 at the front and rear of the bag holder so that the latter may be advanced by the next intermittent movement of the conveyer, and this same operation of the lever 39 lowers and thereby closes the valve 33 in the air duct 25 so that the air suction therethrough is interrupted during the advance of the conveyer and until the next bag holder thereon has been brought to bag receiving and packing position.

A pair of guards 53 are provided for supporting the oppositely extending bag strings as the respective bags are advanced from the transferring and packing position and for preventing catching of the bag strings upon the conveyer or other adjacent parts of the machine, these guards extending from the guards 30 and 31 in the direction of advance of the conveyer and around the adjacent idler pulley 4 thereof in conformity with the travel of the bag holders around this pulley, these guards preferably extending upwardly from the table at the respective sides of the path of travel of the bag holders and having their upper edges inclined inwardly and upwardly into close proximity to the sides of the bag holders.

The means provided by the present invention for drawing the bag strings to close the mouths of the bags and for looping the strings across the tops of the bags, is shown in the present instance as an attachment applied to a bag filling and packing machine of the kind hereinbefore referred to. This attachment, as shown most clearly in Figures 4 to 19 inclusive, comprises a frame 54 the bed of which is bolted or otherwise fixed on the table of the main frame 1, the frame 54 supporting the various parts of the attachment. The attachment comprises a bracket 55 fixed on the frame 54, this bracket having a pair of guides 56 in which a crosshead 57 is reciprocable, and a pair of tubular outer shafts 58 and 59 and a pair of inner shafts 60 and 61 extend through the cross-head so that they may rotate and also move axially therein, these shafts carrying the members of the grippers which grasp the bag strings and draw them to close the bag mouths, the outer shafts 58 and 59 carrying and operating the gripper 62 and the inner shafts 60 and 61 carrying the gripper 63.

Each of the grippers (Figures 15, 16 and 17) which are preferably similar in construction, comprises a gripper member 64 which is clamped or otherwise fixed on the inner of the respective pair of shafts and is formed with a recess 65 and a bill 66 extending forwardly therefrom above the recess, and a cooperating pair of members 67 and 68 which are clamped or otherwise fixed to the outer shaft of the respective pair and are spaced apart to permit the bill 66 of the member 64 to pass between them when the gripper is closed as shown in Figure 17, the member 67 having a bill 69 extending therefrom toward the bill 66 at a level above the recess 65 in the member 64 and the member 68 having a relatively shorter bill 70 extending toward the member 64 at a level below the recess 65. In operation, the members of each gripper are in open position as shown in Figure 16 when a bag is positioned for the drawing of the strings thereof, and the members of the grippers are simultaneously swung into the closed position shown in Figure 17 to grip the respective bag strings. The overlapping relation of the bills 66 and 69 of each gripper prevents upward displacement of the respective bag string, and as the gripper closes, the bill 70 on the gripper member 68 engages beneath the respective string and thereby insures reception of the string in the recess 65 of the gripper member 64 so that when the gripper is completely closed the respective string will be firmly gripped in the respective gripper below the bills 66 and 69 and above the bill 70 and in the recess 65 between the gripper member 64 and the inner edges of the gripper members 67 and 68.

Figure 5:
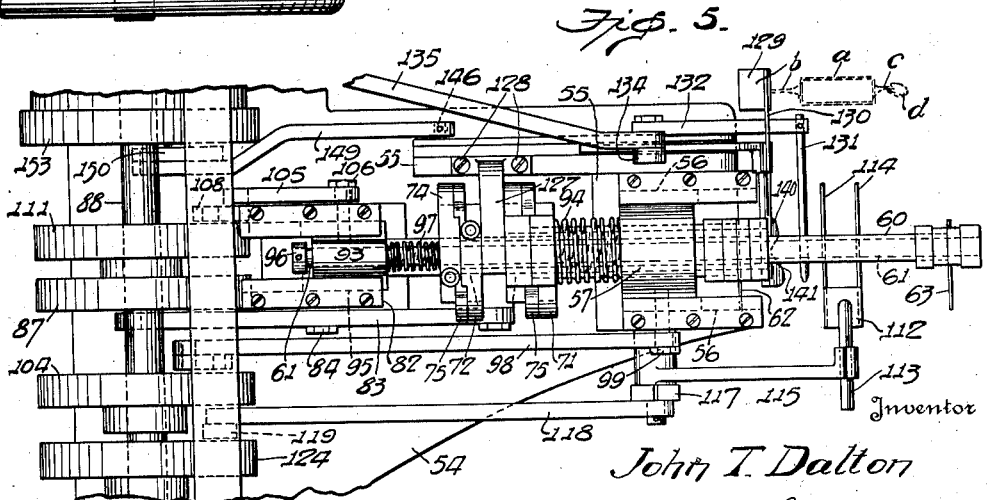
Figure 5 is a view similar to Figure 4 but showing the parts in the positions they occupy after drawing the strings of a bag.

The pair of shafts 58 and 59 carrying the members of the gripper 62 are rotatable, one within the other, to effect the closing and opening movements of the respective gripper members fixed thereto, and the shafts 60 and 61 to which the members of the gripper 63 are fixed are similarly rotatable, one within the other, to effect the closing and opening movements of the respective gripper 63, and the pairs of shafts 58 and 59 and 60 and 61 are relatively movable or slidable axially to carry the grippers, after closing upon and gripping the respective bag strings, from the relatively adjacent positions shown in Figure 4 to the relatively separated positions shown in Figure 5 and thereby draw the bag strings to close the mouth of the bag, after which the grippers are opened and move toward one another back to the position shown in Figure 4. The means for thus operating the grippers comprises a pair of crank arms 71 and 72 clamped or otherwise fixed on the shafts 58 and 60 respectively and projecting to one side of the axis of these shafts and a pair of crank arms 73 and 74 which are clamped or otherwise fixed to the shafts 59 and 61 respectively and project from the opposite sides of the axis of these shafts, crank arms 71 and 72 being operatively connected by links 75 to a pair of slides 76 movable horizontally in a slot 77 formed in a vertical slide 78, and the pair of crank arms 73 and 74 being operatively connected by a pair of links 79 to the slides 76. By this construction, when the slide 78 is in raised position as shown in Figure 18 the crank arms connected to the slide 78 will be swung upwardly and the gripper members will be in open position as shown in Figure 16, and when the slide 78 is moved downwardly, the crank arms will be swung downwardly, as shown in Figure 19, and the members of the grippers will be swung into closed or string gripping position as shown in Figure 17. The slide 78 is guided to move vertically in a guideway 80 formed in the bracket 55 and in a guideway 81 formed in a bracket 82, the latter being bolted or otherwise fixed to the frame 54 of the attachment and this slide is reciprocated vertically at the proper times by a lever 83 which is pivoted at 84 on the bracket 82 and is pivotally connected at 85 to the slide and carries at its opposite end a roll 86 which cooperates with a cam 87, the latter being fixed on a rotating cam shaft 88, this cam shaft (Figures 4 and 11), being journalled in bearings 89 fixed on the attachment frame 54 and having a sprocket wheel 90 fixed thereon, this sprocket wheel meshing with a chain 91 which is driven from a sprocket wheel 92 fixed on the continuously rotating shaft 43.

The grippers are moved relatively toward one another to bring them into position to grip the bag strings and relatively separated to draw the bag strings and thereby close the bag mouths, by reciprocating the crosshead 57 which reciprocates the gripper 62 and a second crosshead 93 which reciprocates the gripper 63. The outermost shaft 58 for the gripper 62 is slidable axially in the crosshead 57 and the gripper 62 abuts against one end of this crosshead as a shoulder, and a compression spring 94 (Figures 4 and 5) is interposed between the opposite end of the crosshead 57 and the crank arm 71 fixed on the shaft 58, so that movement of the crosshead 57 to the left in Figure 4 to draw the gripper 62 away from the gripper 63 to draw or tension the respective bag string will cause the gripper 62 to be so moved through the yielding action of the spring 94, this spring being capable of compressing more or less, as shown in Figure 5, to prevent excess tension on the bag string while the same is being drawn to close the bag mouth. The crosshead 93 which is supported in guides 95 in the bracket 82 so that it is in axial alignment with the crosshead 57, has the shaft 61 of the gripper 63 fitted to rotate and move axially therein, this shaft having a collar 96 fixed on its rear end to abut against the rear end of the crosshead 93 and this shaft being encircled by a compression spring 97 which is interposed between the opposite side of the crosshead 93 and the crank arm 74 fixed on the shaft 61, so that as the crosshead 93 is moved toward the right to carry the gripper 63 from the position shown in Figure 4 to the position shown in Figure 5 to draw the respective bag string incident to the closing of the bag, such movement of the gripper 63 will be effected through the yielding action of the spring 97, this spring compressing more or less and thereby avoiding excess tension on the respective bag string. The springs 94 and 97 will thus serve to insure the exertion of the proper degree of tension on the bag strings to effectively close the bag mouth, but will avoid the exertion of excess tension on the strings, which might cause breakage thereof. In operation, the crossheads 57 and 93 are simultaneously moved from the position shown in Figure 4 toward one another or substantially into the positions shown in Figure 5 to draw the bag strings and are then returned to the positions shown in Figure 4, the crosshead 57 being thus operated by a link 98 which is pivotally connected to this crosshead by a pivot screw 99 at one end and being pivotally connected at 100 to the upper end of a lever 101, the latter being pivoted at 102 to the frame 54 and carrying a roller 103 which cooperates with a cam 104 fixed on the cam shaft 88 (Figure 6). The crosshead 93 is reciprocated by a link 105 which is pivotally connected thereto by a pivot screw 106, said link being pivotally connected at 107 to the upper end of a lever 108, the latter being pivoted at 109 to the frame 54 and this lever carries a roller 110 which cooperates with a cam 111 fixed on the cam shaft 88 (Figure 7), these crosshead operating cams 104 and 111 being so shaped and set on the cam shaft as to cause the crossheads to move simultaneously toward and from one another to cause the grippers to relatively approach one another to engage the bag strings and to move in opposite directions away from one another to draw the bag strings and thereby close the bag mouth.

Means is provided for engaging and indenting a string of each bag into the top thereof after such string has been folded across the closed top of the bag in the manner hereinafter described, such means comprising in the present instance a clamping member 112 (Figures 6, 7, 8 and 10) which comprises preferably a channel shaped member carried by a stem 113 the flanges of which provide a pair of fingers 114 extending in parallelism and in positions to bear on the top of the closed bag in the bag holder 3, the front and rear walls of the latter being provided with notches or recesses 115 to receive the fingers 114 and thereby permit the latter to indent a folded bag string into the top of the bag when pressed downwardly thereon, these fingers being located between the grippers 62 and 63 so that they will act on the bag occupying a position between them. These fingers 114 will be in raised position relatively to the bag while the grippers are moved toward one another or into the position shown in Figures 4 and 6 to engage the bag strings, and are relatively separated to draw the bag strings, as shown in Figure 5, the fingers being pressed down upon the top of the bag after the drawn bag strings have been released from the grippers and one of the bag strings folded as hereinafter described, to indent the folded string into the closed top of the bag. The fingers 114 are operated by a lever 115 to which the finger supporting stem 113 is clamped or otherwise fixed, this lever being pivoted on a shaft 116 supported on the bracket 55 and connected to a lever 117, the latter being operatively connected by a link 118 to a lever 119, the latter being pivoted at its upper end at 120 to a bracket 121 supported on a frame member 122 above the cam shaft 88, and the lever 119 carrying a roller 123 which cooperates with a cam 124 fixed on the cam shaft 88, this cam being so shaped and set on the cam shaft that it will hold the fingers 114 in raised position until after the grippers have been relatively separated to draw the bag strings and thereby close the bag and one of the bag strings has been folded or looped across the top of the closed bag, the pressure of the fingers 114 on the folded bag string causing the latter to be indented into the top of the bag and thereby held so as to prevent displacement thereof. After the bag has been advanced by the movement of the conveyer which carries the bag from beneath the fingers 114, the folded string thereof is held against displacement from the top of the bag by a rail-like member 125 which is channel shaped in cross section (Figure 2) providing flanges which are spaced to enter the notches 115 in the top of the bag holder, this member 125 being rigidly supported by suitable supports 126 attached to the main frame of the machine so that the flanges of the member 125 will bear on the tops of the bags and the folded strings overlying the bag tops as the bags are carried downwardly through the guideway 5, the member 125 thereby maintaining the folded bag strings in place on the respective bag tops. After a bag has been advanced and thereby removed from beneath the fingers 114, the latter rise or return to the position shown in Figure 4, ready to engage and indent the folded string of the next bag after the same has been folded thereon as hereinafter described.

Means is preferably provided for regulating the extent to which the bag strings are drawn in closing the bag mouth, such means comprising a block 127 which may be detachably secured as by screws 128 to a part of the bracket 55 so as to extend into the space between the inner crank arms 72 and 73, this block limiting the extent of approaching movement of these crank arms, as shown in Figure 5, and thereby limiting the extent of relative separating movement of the grippers to which these crank arms are connected. By using blocks 127 of different thicknesses, the extent of separating movement of the grippers in drawing the bag strings may be varied to suit bags of different sizes.

In order to insure that the string b of each bag will extend from the respective side of the bag as it enters between the grippers 62 and 63, a brush 129 is provided which operates to sweep this string outwardly or in a direction from the bag immediately before each bag is presented to the grippers. The brush is preferably carried on an arm 130 which is fixed to the gripper member carried by the shaft 59, so that as this gripper member swings toward the companion gripper member to grip the string of a bag, the brush 129 will be swung downwardly into engagement with the top of a bag in next succeeding order on the conveyer, and when the gripper 62 is operated to draw the gripped bag string, the brush 129 will be correspondingly moved to sweep the bag string b away from the bag and into a position where it will be gripped by the gripper 62 when this bag has been advanced into position for operation of the grippers upon the strings thereof. When the grippers open, the brush 129 will be swung upwardly, thereby avoiding interference with the positioning of the next bag beneath it. Figure 4 shows the brush 129 above a bag so as to engage the string b overlying the top thereof and Figure 5 shows the brush shifted to sweep the string b from the bag and into extended position.

Means is provided for folding the strings b over the tops or closed ends of the bags. Such string looping means, shown most clearly in Figures 4, 5, 7 and 12, comprises a pin 131 fixed to an arm 132, the latter being mounted on a pivot 133 supported on the bracket 55 and connected to an operating arm 134, the latter being pivotally connected by a link 135 to a lever 136 pivoted at 137 on the frame 54, and said lever carrying a roller 138 which cooperates with a cam 139 fixed on the cam shaft 88 (Figures 9 and 11). The mounting of this pin 131 on the lever 132 and operation of the latter through the connection described from the cam 139 effects lowering of the pin 131 to operative position immediately previous to the string folding operation and lifting of this pin out of operative position after the string folding operation has been completed. The string folding means also comprises a string folding finger 140 which is composed preferably of a flat blade having a notch 141 therein to receive the string, this finger being clamped or otherwise fixed to a bar 142 which carries a roller 143 arranged to travel in a cam slot 144 formed in a plate 145 fixed to a side of the bracket 55 (Figures 7 and 13), the bar 142 having a pivot pin 146 secured thereto and operating in a guide slot 147 formed in a plate 148 which is also secured to the bracket 55 at the outer side of the plate 145, the bar 142 being reciprocated by a link 149 which is pivotally connected at one end to the pivot pin 146 and is pivotally connected at its other end to a lever 150, the latter being pivoted at 151 on the frame member 122 and carrying a roller 152 which cooperates with a cam 153. The shape of the cam 144 in which the roller 143 on the bar 142 travels is such that when the bar 142 is in normal position as shown by the full lines in Figure 7, the string folding finger 140 will be in lowered position at one side of the bag in operative position, and after the grippers 62 and 63 have engaged the bag strings and drawn them to close the bag, the bar 142 is moved toward the left in Figure 7, the pin 131 having been previously lowered by its cam into operative position after the grippers have drawn the bag strings and such movement of the finger 140, due to the shape of the cam 144, will cause this finger to rise and pass over the pin 131 and then over the top of the bag, thereby folding the string b around the pin 131 and laying it across the top of the closed bag, the finger 140 during this operation passing beneath the fingers 114 which are then in raised poistion, and the final portion of the advancing movement of the finger 140 lowers this finger, due to the shape of the cam 144. After the finger 140 has completed its string folding stroke, the fingers 114 are lowered upon the top of the bag, and the finger 140 then makes its return stroke back to the position shown in Figure 7, it passing over the lowered fingers 114 in doing so.

The bags with the strings folded thereon pass from beneath the fingers 114 and along the rail 125 in the manner previously described and they are brought successively by the intermittent advances of the conveyer to a position opposite to a plunger 154 which is reciprocable in a guideway 155 which communicates with the open bottom of a bag holder when positioned opposite thereto, this plunger, when forced into the bottom of the respective bag holder, serving to compact the tobacco or other material in the bag and to flatten the upper and lower ends of the bag, the force thus applied to the bag being sustained by the rail 125 which engages the upper end of the bag. While one bag is thus positioned opposite to the plunger 154 the next bag in advance thereof is positioned by its bag holder in alignment with an ejector 156 which is supported by a guide 157 to operate through the open bottom of the bag holder and thereby eject the bag endwise therefrom onto a plate or support 158. The ejector is reciprocated at the proper times for the ejection of the bags by a lever 159 pivoted on the frame of the machine at 160 and connected to the ejector by a link 161, the lever 159 being connected by a link 162 to a lever 163 pivoted on the frame of the machine at 164 and provided with a roller 165 arranged to cooperate with a cam 166 on the shaft 12, a spring 167 acting on the lever 163 to hold the roller 165 thereon in contact with the cam and to insure retraction of the ejector. The plunger 154 is operated by a lever 168 pivoted at 169 to the frame of the machine and pivotally connected at 170 to the ejector 154, a spring 171 acting on the lever 168 to normally hold the plunger 154 in retracted position and the lever 168 projecting into the path of a shoulder 172 on the ejector 156 so that it will be actuated thereby to force the plunger 154 inwardly against a bag while the ejector is operating to eject the preceding bag from its holder on the conveyer.

The ejector has a sufficiently long stroke to carry the ejected bag over the plate or support 158 and past a stamp x, such as a revenue stamp, the stamps being contained in a suitable magazine 173 from which they are withdrawn successively by a gripper 174 which may be of any suitable or known construction, each stamp while being withdrawn from the magazine passing over a roller 175 which serves to apply adhesive thereto. As each bag engages a stamp, which may pass upwardly through a slot 158$^a$ in the plate or support 158 as shown in Figure 2, the closed mouth or upper end of the bag will engage the stamp about midway of its length, and as the bag continues to advance, the stamp will be doubled across the mouth or upper end of the bag and its ends will be affixed to the opposite sides of the bag, a brush 176 being preferably mounted above the plate 158 to bear on the stamp applied to the upper side of the bag lying thereon and thereby applying pressure to the end of the stamp applied to that side of the bag and the brush pressing the bag downwardly on the plate 158 with sufficient pressure to affix the other end of the stamp to the underside of the bag. The gummed stamp thus applied across the mouth or upper end of the bag is brought into adhesive contact with the folded string which overlies the top of the bag and such string will be held by the gum or adhesive on the stamp so that displacement of such string is prevented. The bags after the stamps have been applied thereto may be conveyed to any suitable point for packing or shipment.

Means is provided for supplying a bag to the stamp affixing means in the event a bag is missing in one of the bag holders on the conveyer. Such means comprises a vertical magazine 177 which is open at the top to receive a stack of bags having the strings thereof drawn to close the mouths thereof and one of the strings of each bag folded across the upper end thereof as shown in Figure 20. An ejector 178 is pivoted on the machine frame at 179 so that it will reciprocate through an opening 180 in one side of the magazine on a level with the lowermost bag resting on the bottom of the magazine, inward movement of the ejector serving to force the lowermost bag out of the magazine and onto the plate 158 in front of the ejector 156, the ejector 178 being shown in ejecting position by the full lines in Figure 20, and retraction of the ejector into the dotted line position shown in that figure allowing the stack of bags in the magazine to descend to bring the lowermost bag in position for ejection by the ejector upon the next operation thereof. The ejector is preferably actuated on its ejecting stroke by a tension spring 181 one end of which is attached to the ejector lever at 182 and the other end of which is attached at 183 to a link 184 one end of which is pivoted to the ejector lever at 185 and the other end of which is pivoted at 186 to a lever 187 pivoted on the machine frame at 187a and provided with a treadle 188 adapted to be controlled by the foot of the attendant so that when the treadle is depressed into the dotted line position shown in Figure 20 the ejector will be retracted into the dotted line position and when the pressure of the attendant's foot is released from the treadle, the spring 181 will act to swing the ejector lever and the parts connected thereto into the full line position shown in this figure, the ejector being thereby operated upon its ejecting stroke. Depression of the treadle into its lower or dotted line position retracts the ejector from beneath the stack of bags in the magazine and allows the lowermost bag to assume a position in front of the ejector for ejection thereby. The stroke of the ejector in each direction is controlled by a link 189 which is pivotally connected at 190 to the ejector lever and is provided toward its opposite end with a slot 191 in which a pin 192 fixed in the lever 187 operates, the retracting stroke of the ejector being arrested by the engagement of the pin 192 against the left-hand end of the slot 191 as shown by the dotted lines in Figure 20 and the ejecting stroke of the ejector being arrested and limited by engagement of the pin 192 with a set screw 193 at the other end of the slot 191, the set screw enabling the position of the ejector when fully advanced to its normal position to be adjusted so that it will lie in the opening 180a in the side of the magazine and its forward edge will serve as a side of the passageway over the plate 158 over which the packages are advanced to the stamping device.

In order to prevent displacement of the bag strings c and the tags d thereon while the bags are being carried down vertically through the guideway 5, each bag holder 3 is provided with a plate 194 which is fixed thereto and projects from the narrow side thereof at which the tag carrying string is located, each of these plates providing a ledge on which the string c and tag d will be supported when the respective bag holder is tipped into horizontal position as shown in Figure 1. Each of these plates is formed with a notch or recess 195, and a guard rail 196 is fixed at its upper end to the frame of the machine as at 197, this guard rail being so located that it will lie in the notches 195 in the plates 194 on the bag holders as the latter pass downwardly through the vertical guideway 5, this guard rail thereby preventing the tag carrying strings from swinging out of place at the proper side of the bags. The lower end 198 of this guard rail terminates substantially on a level with the plate 158 so that the tag carrying strings of the bags may pass beneath this rail during ejection from the bag holders. The lower edges 199 of the plates 194 are preferably beveled so as to avoid catching of the tag carrying strings thereon during removal of the bags from the holders.

The operation of a bag packing and stamping machine embodying the present invention as hereinbefore described is as follows:—The conveyer chain 2 carrying the bag holders 3 is advanced intermittently to position each bag holder successively at the different stations by the sprocket wheel 6 engaging the chain and driven from the continuously rotating shaft 12 through the interrupted or intermittent gears 10 and 11 and intermittently rotating shaft 9, and the head 14 is concurrently rotated intermittently, a quarter revolution at each step, through the gears 19 and 21, shaft 22, and gears 23 connecting said shaft to the intermittently rotating shaft 9, these intermittent movements of the head 14 successively positioning each filling tube 15 thereon first in a position which enables the attendant to slip an open empty bag upon its lower end, then in a position beneath the filling chute or hopper 16 where the bag receives a charge of material, then in a position below the packing plunger 17 and immediately above a bag holder on the conveyer, the head 14 descending to carry a filled bag on the filling tube down into a bag holder which will then be in register with the bag and filling tube and the plunger descending to pack the material in the bag under confinement of the bag holder, the head 14 then ascending to withdraw the filling tube from the bag and bag holder while the bag is held down in the holder by the plunger 17, after which said plunger rises out of the filling tube and the head 15 rotates to carry the empty filling tube back to position to receive another empty bag, the conveying chain advancing a step concurrently with the rotation of the head 14 after each operation of transferring a filled bag to a bag holder thereon.

The bags are applied to the filling tubes 15 so that the bag strings c carrying the tags d are toward the center of the rotatable head 14, the other bag strings b being located at the outer sides of the filling tubes, and as each bag is lowered into a bag holder, the string b will be presented toward the suction mouth 26 and the string c and tag d will be presented toward the opposing suction mouth 27.

The suction fan 29 preferably operates continuously and suction is maintained constantly in the duct 24 to remove any loose tobacco or other material that may spill from the bag, but as each bag holder is brought into bag receiving position, the cam 42 allows the rollers 48 to descend at the front and back of such holder, thereby positioning the latter accurately in alignment with the filling tube so that the bag will be transferred with certainty therefrom to the bag holder, and the cam 42 also, through the link 38, shaft 35 and arms 34 and 37 lifts the valve 33 and thereby establishes communication between the suction duct 25 and the suction fan 29, and the suction maintained at the mouth 26 of the duct 24 and the suction established at the mouth 27 of the duct 25 by the opening of the valve 33 acts to pull the strings b and c and the tag d on the latter string away from the respective sides of the bag so that these strings will project therefrom.

After a bag holder has received a filled bag, the conveyer advances a step to remove such holder from bag receiving position, such being permitted by lifting of the rollers 48 and lowering or closing of the valve 33 by the cam 42, and during the removal of the bag and bag holder from bag receiving position, the strings $b$ and $c$ and the tag $d$ rest on the ledge-like guards 30 and 31 so that the bag strings or tag cannot become entangled in the conveyer or other adjacent parts of the machine, the continued advance of the bag and bag holder bringing the bag strings into positions where they rest upon the guards 53 which support the strings and tag and prevent entanglement thereof with the conveyer or other adjacent parts of the machine, and the second step in the advance of the bag and bag holder from bag receiving position brings the bag and its holder into position beneath the flanges or fingers 114 of the string pressing member 112 while the latter is in raised position as shown in Figures 6 and 7, and the bag strings are brought by this advance of the conveyer into positions for grasping by the grippers 62 and 63 which, at this time, are near to one another as shown in Figures 4, 6, 7 and 10. Also, as each bag is brought into position to enable the strings thereon to be grasped by the grippers, the finger 131 is in raised position and the finger 140 is in lowered position at one side of the bag, so that the bag strings when presented to the grippers lie below the grippers, the pressure fingers 114 and the finger 131 and above the folding finger 140, as shown in Figure 21, the grippers at this time being open, as shown in Figure 22. During the pause in the advance of the conveyer after a bag holder and bag have been thus presented to the grippers, the cam 87 operates the lever 83 to lower the vertically movable slide 78, such movement of this slide pulling the links 75 and 79 downwardly and thereby rocking the crank arms 71 and 72 fixed to the shafts 58 and 60 in one direction and swinging the crank arms 73 and 74 fixed to the shafts 59 and 61 in the opposite direction, in consequence of which the gripper members 64 fixed on the shafts 58 and 60 and the gripper members 67 and 68 fixed on the shafts 59 and 61 will be simultaneously swung toward one another, and during this closing movement of the grippers, the overlapping bills 66 and 69 which overlie the bag strings will prevent upward displacement thereof while the lower bills 70 on the gripper members 68 will pass under the respective bag strings, causing the latter to be gripped firmly between the respective gripper members and in the recesses 65 of the corresponding gripper members 64, as shown in Figures 23 and 24.

While the bag strings $b$ and $c$ are thus gripped by the grippers 62 and 63 respectively, the grippers are relatively separated or forced apart toward or into the position shown in Figure 5 by movement of the crosshead 57 in one direction by the cam 104 acting through the lever 101 and link 98 and movement of the crosshead 93 in the opposite direction by the cam 111 acting through the lever 108 and the link 105; such relative separating movement of the grippers while they grasp the bag strings causing the bag strings to be pulled or drawn to pucker or close the bag mouth, as shown by the dotted lines in Figure 23 or by the full lines in Figure 25. Since the cams 104 and 111 operate the crossheads 57 and 93 to thus separate the grippers to draw the bag strings, through the yieldable compression springs 94 and 97, the drawing of the bag strings under the requisite tension to effectively close the bag mouth will be insured, such tension being determined by the strength of these springs, but undue tension which would tend to break the bag strings will be avoided since these springs will yield when a given tension on the strings has been reached and the relative separating movements of the grippers will then cease although the crossheads may make their full strokes under the action of their respective cams. Moreover, by using a filler block 127 of appropriate thickness between the gripper operating crank arms 72 and 73, the extent of relative separating movement of the grippers in drawing the bag strings may be predetermined, according to the size of the bag or the extent the strings thereof should be drawn to effectively close the same, this being clear from Figure 5 which shows the gripper separating movement limited by the limiting block 127.

While the grippers are swinging into engagement with the strings of a bag presented thereto, the brush 129 attached to the members 67 and 68 of the gripper 62 swings downwardly on the top of a bag next following the one presented to the grippers, and when the grippers are relatively separated to draw the bag strings of the bag presented thereto, the brush 129 is moved in a direction laterally from the preceding bag, thereby sweeping the string $b$ thereon in a direction to extend it from the respective side of the bag, as shown in Figure 5.

After the grippers 62 and 63 have been relatively separated and the strings $b$ and $c$ of the bag presented thereto drawn to close the bag mouth, the finger 131 is lowered so that it bears on the upper side of the string $b$, (Figure 25) such lowering of the finger 131 being effected by the cam 139 acting through the lever 136 and link 135, immediately following which the grippers 62 and 63 are opened to release the bag strings by upward movement of the slide 78 under the action of the cam 87 and the finger 140 is then moved transversely over the lowered finger 131 and transversely across the top of the bag beneath the pressing fingers 114, which are then in raised position, the finger 140 being thus operated by the cam 153 acting through the lever 150 and link 149 which reciprocate the bar 142 which carries the finger 140, and during such movement of the finger 140 across the top of the bag, said finger rises while passing over the bag mouth, due to the contour of the cam 144 in which the guiding roller 143 on the bar 142 travels. Immediately after the finger 140 has commenced its operation, the grippers 62 and 63 are opened to release the bag strings, by raising of the slide 78 under control of the cam 87 which rocks the crank arms 71 and 72 and 73 and 74 back to their normal or initial position, and as the transverse movement of the finger 140 continues, the bag string $b$ is folded over the finger 131, which is still in its lowered position, and the string $b$ is finally folded or laid across the upper end or mouth of the bag, as illustrated diagrammatically by the full and dotted lines in Figure 26.

After the finger 140 has completed its string folding operation, the pressing fingers 114 are forced downwardly upon the strings and the top of the bag as shown in Figure 27, these fingers 114 being thus operated by the cam 124 acting through the lever 119, link 118 and levers 115 and 117, the fingers 114 being thus caused to indent the bag strings into the upper end of the bag thereby bringing the strings composed of fibrous material into such intimate contact with the fibrous material comprising the bag that the strings will cling or adhere thereto after the bag has been advanced from beneath the fingers 114, the folded string *b* being thereby retained in place across the top of the bag in substantially the position shown in Figure 29 and the pressure applied to the string *c* beyond the closed bag mouth acting to retain this string in place on the bag top so that it extends to the adjacent narrow side of the bag, during the further travel of the bag through the machine. While the fingers 114 are in their lowered position, the folding finger 140 swings back to its normal or initial position, this movement of the finger 140 carrying it above the lowered fingers 114, as will be clear from Figure 28.

While the fingers 114 are lowered to hold the bag strings and at about the time the folding finger starts its return movement, the conveyer advances a step to remove the closed bag and to bring the next succeeding bag into position for closing by the grippers, after which the finger 131 rises and the open grippers return to the positions shown in Figure 21 for operation upon such succeeding bag.

As the closed bag is removed from closing position, it is carried longitudinally beneath the fingers 114, which are then in lowered position, so that these fingers hold the bag strings pressed in the indentations they form in the top of the bag and thereby prevent displacement of the strings from their positions on the bag, as shown in Figure 29, and when the bag passes from beneath the fingers 114, after which they rise and thus return to the position shown in Figure 21, it enters beneath the rail 125 the flanges of which engage the bag strings and maintain them in the indentations into which they are pressed in the top of the bag. As the bag passes from the top of the table on the main frame, the tag *d* rests on the guard 53 and is thereby prevented from becoming entangled with any of the adjacent parts of the machine, and as the bag swings into a horizontal position and descends in the vertical guideway 5, the string *c* engages the plate 194 projecting laterally from the respective bag holder and is prevented from disengaging from said plate by the rail 196, the plate 194 thus assisting in retaining the string *c* in proper position on the bag mouth and preventing catching of the tag on adjacent parts of the machine. As each bag holder pauses in alignment with the plunger 154, the latter is forced into the bag holder by the ejecting stroke of the ejector 156, operated by the cam 166 through the levers 163 and 159 and links 161 and 162, the plunger 154 acting to flatten the ends and thus shape the bag and to again firmly indent the strings in the top of the bag by forcing it against the flanges of the rail 125, and while a bag holder is thus operated on by the plunger 154, the preceding bag holder on the conveyer is positioned in alignment with the ejector 156, and the latter operates through this bag holder, pushing the bag therefrom across the plate 158 against a revenue or other stamp *x* which has been drawn from the magazine 173 by the gripper 174. This stamp, which has been gummed by the gumming roller 175, engages the mouth of the bag and the strings extending across the top of the bag, and as the advancing movement of the bag continues, the upper end of the stamp *x* is pulled free from the gripper 174 and the opposite end of the stamp is pulled from the magazine 173, and the brush 176 bears on the upper end of the stamp and presses it on the upper side of the bag so that it will become affixed thereto while the lower end of the stamp is pressed against the lower side of the bag and is thereby affixed thereto, the gum or adhesive applied to the stamp causing the string extending across the top of the bag to become affixed thereto, whereby loosening or displacement of the bag strings is prevented, the bag as delivered from the machine being represented in Figure 30.

In the event a bag is missing from one of the bag holders on the conveyer, due to failure of the attendant to apply a bag to one of the filling tubes, a bag to replace the missing one may be quickly introduced onto the plate 158 from the magazine 177 by the attendant, by placing his foot on the treadle 188 and depressing it and then removing his foot therefrom. This treadle is normally held by the spring 181 in the raised position shown by the full lines in Figure 20, the bag ejector 178 being then in advanced position, and depressing of the treadle 188 by the attendant's foot retracts the ejector 178 into the dotted line position shown in Fig. 20, thereby withdrawing it from beneath the stack of bags in the magazine 177 and thus allowing the lowermost bag to drop into position in front of the ejector, after which the attendant removes his foot from the treadle, the spring 181 then acting to swing the bag ejector 178 back to its normal full line position shown in Figure 20, thereby pushing the lowermost bag in the magazine laterally on to the plate 158 in front of the ejector 156 before the latter has advanced, so that the advancing stroke of the ejector 156 will advance this bag and a stamp will be applied thereto in the same manner as hereinbefore described, the forward edge of the ejector, while in the normal full line position, lying in the opening 180ª in the side of the magazine through which the bags are ejected therefrom, and serving as a side of the passageway over the plate 158 along which the bags are advanced to the stamping device. It is to be understood that the bags supplied to the magazine 177 will be filled and closed and the bag strings will be laid across the top of the bag and one of the bag strings folded in the same manner as accomplished by the grippers and folding means operating on the bags on the conveyer as hereinbefore described.

If desired, both of the strings of the bag may be folded or looped across the top thereof as shown in Figure 36, means for accomplishing this result being shown in Figures 31 to 35 inclusive. In this embodiment of the invention, the same mechanism hereinbefore described, excepting the fingers 114 and their operating mechanism which are omitted, is employed for performing the various operations described, including the finger 131 over which the bag string *b* is folded or looped by the transversely movable finger 140, and a finger 140ª, like the finger 140 but pointing in the opposite direction, is added, and this finger normally occupies a position at the opposite side of the bag, when positioned with respect to the grippers, relatively to the side of the bag at which the finger 140 is normally positioned. Figure 31 shows the fingers 140 and 140ª in their normal positions at opposite sides of a bag when the latter is in position for grasping of the strings *b* and *c* thereof by the grippers 62 and 63, and Figure 32 shows the fingers 140 and 140ª in the positions they occupy after the grippers have been moved apart to draw the bag strings to close the mouth thereof, the finger 131 however having descended so as to bear on the upper side of the string *b*. The next operation, as before, is performed by the movement of the finger 140 in the path indicated by the dotted lines in Fig. 33, over the finger 131 and over the top of the bag to fold or loop the string b over the bag top, the finger 140ᵃ being then still in its normal position and supporting the string c which has been released by opening of the gripper 63. The finger 140ᵃ then moves in the path indicated by the dotted lines in Figs. 34 and 35, inwardly over the top of the bag and over the finger 140 while the latter is still in its extended position, thereby causing the bag string c to be folded or looped over the finger 140 so as to overlie the top of the bag, as shown in Figure 34. When the finger 140ᵃ approaches a position above the center of the bag, it is forced downwardly on to the center of the top of the bag as shown in Fig. 35, thereby imbedding the folded strings in the top of the bag so as to prevent displacement thereof, the bag strings b and c at this time being looped around the fingers 131 and 140 respectively, and while the finger 140ᵃ presses the strings down on the top of the bag, the holder containing the bag advances, carrying the bag from beneath the finger 140ᵃ and then under the member 125 the flanges of which then press the looped strings down on the top of the bag and thereby retain them in position thereon. Since the fingers 131 and 140 both point in the direction in which the bag is to be advanced, the advancing movement of the bag, following the folding or looping of the strings thereof, will slide the strings off the ends of these fingers, and the fingers 131 and 140 then return to their normal positions, the finger 140 passing over the finger 140ᵃ, and the finger 140ᵃ then returns to its normal position. The mechanism for operating the additional finger 140ᵃ may be like that shown and described for operating the finger 140, comprising the bar 142 to carry the finger 140ᵃ and having a roller 143 traveling in a cam track 144 formed in a plate 145 and a pivot pin 146 traveling in a slot 147 in a plate 148, and a link 149 connected to a lever 150 carrying a roller 152 traveling in an operating cam 153 on the cam shaft 88, these duplicated parts however being located at the opposite side of the bracket 55 from that at which the parts described for operating the finger 140 are located and being substituted in place of the levers 115, 117 and 119, link 118 and cam 124 for operating the fingers 114 which are omitted, the finger 140ᵃ being adjusted or set to travel in a path above the finger 140 as indicated by the dotted lines in Fig. 35 so that it will pass thereover and the operating cam for the finger 140ᵃ being set to normally position this finger as shown in Figures 31 and 32. In using the additional finger 140ᵃ, the fingers 114 are omitted as previously stated, and the tag may also be omitted, but the other operations described, including the affixing of a revenue or other stamp, across the top of the bag to secure the strings as shown in Figure 36 will be performed as hereinbefore set forth.

The present invention provides means for rapidly and automatically pulling or drawing the draw strings of a bag to close the mouth thereof, for looping or folding one or both of the draw strings across the top of the bag and for maintaining the folded string or strings in proper position on the top of the bag to prevent displacement thereof preparatory to the affixing of a revenue or other stamp across the top of the bag and which serves to retain the folded or looped string or strings in proper position on the top of the bag to prevent displacement thereof preparatory to the affixing of a revenue or other stamp across the top of the bag and which serves to retain the folded or looped string or strings in proper position thereon, the invention further providing means for arranging the draw strings of the bag so that they will be received and operated on with certainty by the grippers which draw or tighten the strings to close the bag and the cooperative string folding or looping means. The finished bag may be easily and quickly opened by the user by grasping the free end of the folded string and pulling upwardly thereon, the string thus pulled severing the portion of the revenue or other stamp which overlies the strings so that the bag mouth is exposed for opening.

I claim as my invention:

1. In a machine embodying a conveyer for advancing holders for bags having draw strings for closing the mouths thereof, a pair of grippers having means supporting them in planes at opposite sides of the path of said holders for movement toward and from one another in a direction transversely of said path, each gripper embodying gripper members supported by said supporting means for relative movement respectively in said planes, means for relatively moving the members of the grippers in said planes at opposite sides of the bag to grip the draw strings of a bag positioned between them, and means for relatively separating the grippers by movement thereof in a direction transversely of the path of advance of the bag holders to draw the bag strings and thereby close the bag mouth.

2. In a machine embodying a holder for a bag having draw strings for closing the mouth thereof and means for advancing such holder, a pair of grippers located at opposite sides of the path of the bag holder, each gripper emboding cooperating members, means pivotally supporting the gripper members coaxially and supporting the grippers for movement axially toward and from one another, means for simultaneously swinging the members of the grippers to engage and grip the draw strings of a bag, and means for simultaneously moving the grippers axially in a direction away from one another and transversely of the path in which the bag holder advances to draw the bag strings and thereby close the bag mouth.

3. In a machine embodying a holder for a bag having draw strings for closing the mouth thereof and means for advancing such holder, a pair of grippers each embodying relatively movable gripper members, means for pivotally supporting the gripper members on an axis located above and extending transversely of the path of advance of said holder with the grippers located in planes at opposite sides of said path to receive the draw strings of a bag in the holder, said means supporting the grippers for approaching and separating movements in the direction of said axis, means for swinging the gripper members about their pivotal axis to grip the draw strings of a bag, and means for relatively separating the grippers axially to draw the bag strings and thereby close the bag mouth.

4. In a machine embodying a holder for a bag having draw strings for closing the mouth thereof and means for advancing such holder, a pair of grippers each embodying members, means pivotally supporting said gripper members on an axis extending horizontally above the path of said holder, and also supporting the grippers for approaching and separating movements in the direction of said axis, said grippers being located at opposite sides of the path of the holder, means for simultaneously swinging the gripper members about their pivotal axis to engage and grip the draw strings of a bag in the holder, and means for simultaneously moving the grippers apart axially to draw said strings and thereby close the bag mouth.

5. In a machine embodying a holder for a bag having draw strings for closing the mouth thereof and means for advancing such holder, a pair of grippers for the bag strings located at opposite sides of the path of advance of said holder, each gripper embodying relatively movable members, coaxially mounted shafts to which the respective gripper members are connected, a reciprocatory member operatively connected to said shafts for simultaneously rotating them in directions to close the grippers, and means operative upon the shafts for the respective grippers to move the grippers apart axially.

6. In a machine embodying a holder for a bag having draw strings for closing the mouth thereof and means for advancing such holder, a pair of grippers at opposite sides of the path of advance of said holder to engage the strings of a bag therein, each gripper embodying relatively movable members, coaxially mounted shafts to which the respective gripper members are connected, means for rotating said shafts to close the grippers, and means operative yieldingly on said shafts to move them axially in directions to move the grippers apart.

7. In a machine embodying a holder for a bag having draw strings for closing the mouth thereof, a pair of grippers for said bag strings each embodying relatively movable members, coaxially mounted shafts to which the respective gripper members are connected, means for rotating said shafts in directions to close the grippers, means for moving said shafts axially to relatively separate the grippers, and a spacing block for predetermining and limiting the extent of axial movement of said shafts.

8. In a machine embodying a holder for a bag having draw strings for closing the mouth thereof, cooperative folding members, means for gripping and drawing said bag strings outwardly from the bag so that at least one of said strings extends under one of said folding members and above another of said folding members, and means for moving the folding member over which said string extends laterally over said other folding member under which said string extends to fold said string across the top of a bag in the holder.

9. In a machine embodying a holder for a bag having draw strings for closing the mouth thereof, means for gripping and drawing said bag strings, a finger engageable with one of said bag strings, and a cooperative finger movable transversely above the bag mouth to fold the string engaged by the first mentioned finger thereover and over the top of the bag.

10. In a machine embodying a holder for a bag having draw strings for closing the mouth thereof, means for gripping and drawing said bag strings into extended positions at opposite sides of the bag, a finger movable into engagement with one of said strings, and a cooperative finger movable transversely above the bag mouth from one side to the opposite side thereof and operative to fold the bag string extending from one side of the bag and engaged by the first-mentioned finger over said finger and over the top of the bag toward the opposite side of the bag.

11. In a machine embodying a holder for a bag having draw strings for closing the mouth thereof, means for gripping and drawing said bag strings, means for folding a string of the bag across the closed top thereof, and means for indenting such folded string into the top of the bag.

12. In a machine embodying a holder for a bag having draw strings for closing the mouth thereof, means for gripping and drawing said bag strings, means for folding a string of the bag across the closed mouth thereof, and fingers movable into engagement with the closed top of the bag to indent the folded string therein.

13. In a machine embodying a holder for a bag having draw strings for closing the mouth thereof, means for gripping and drawing said bag strings to close the bag mouth, fingers movable downwardly into engagement with the closed top of the bag, and means movable transversely above the top of the bag to fold a string thereof upon its closed top, said folding means being movable beneath said fingers during the string folding operation thereof and movable above said fingers during the return movement of said means.

14. In a machine embodying a holder to receive a bag having draw strings for closing the mouth thereof and means for advancing said holder, suction-means located at opposite sides of the path of movement of the holder for extending the strings in opposite directions from a bag therein, and means for gripping and drawing the extended bag strings to close the bag mouth.

15. In a machine embodying a holder to receive a bag having draw strings for closing the mouth thereof and means for intermittently advancing the holder, suction-means located at a side of the path of advance of the holder for extending the string from the respective side of the bag, means for rendering said suction-means inoperative during the advancing movement of the bag holder, and means for gripping and drawing the bag strings to close the bag mouth.

16. In a machine embodying a holder for a bag having draw strings for closing the mouth thereof, means for gripping and drawing the bag strings to close the bag mouth, and means for intermittently advancing the holder from bag receiving position to string gripping and drawing position, suction-means located at the opposite sides of the path of advance of the bag holder and operative to extend the bag strings from opposite sides of the bag while the holder is in bag receiving position, and means for guiding such extended strings while the bag is advancing to string gripping and drawing position.

17. In a machine embodying a conveyer carrying holders to receive bags having draw strings for closing the mouths thereof, means for gripping and drawing the bag strings to close the bag mouths, and means for intermittently moving the conveyer to advance the holders from bag receiving position to bag string gripping and drawing position, means operative to extend the strings from the opposite sides of the bags while the respective bag holders are in bag receiving position, and guards extending along the sides of the conveyer from the bag receiving position toward the bag string gripping and drawing position for guiding the strings extended from the sides of the bags in the bag holders.

18. In a machine embodying holders each adapted to receive a bag having draw strings for closing the mouth thereof, and means for advancing the holders intermittently, grippers each embodying relatively pivoted members having means for operating them to grip the strings of a bag, the grippers being movable apart axially to draw the bag strings, and a brush connected to a member of one of the grippers and movable into position to act on a bag in a holder succeeding the bag in operative relation with the grippers and actuated by the axial movement of the respective gripper to brush a string on the bag in said succeeding holder into extended relation with the respective bag.

19. In a machine embodying a conveyer carrying holders each adapted to contain a bag having draw strings for closing the mouth thereof, and means for intermittently advancing the conveyer, means operative successively on the strings of bags in the holders to draw the strings to close the bag mouths and to fold at least one string on the closed end of the respective bag, means movable into engagement with the folded string to indent it in the closed end of the respective bag, an ejector for removing the bags from the holders, and a rail having portions arranged to bear on the indented portion of the folded string of each bag to hold it in indented relation with the closed end of the respective bag during its advance toward the ejector.

20. In a machine embodying a conveyer carrying holders each adapted to contain a bag having draw strings for closing the mouths thereof, said conveyer supporting the holders successively in upright and tilted positions during its advance, guard plates attached to and projecting laterally from the holders to be engaged by strings on the bags as the latter assume tilted position, and a guard rail extending along the conveyer and cooperative with said guard plates on the holders to prevent disengagement of said strings from said guard plates.

21. In a machine embodying a conveyer carrying holders each adapted to hold a bag having draw strings for closing the mouths thereof, and means for advancing the conveyer intermittently, means for successively drawing the strings of the bags to close the mouths thereof and for folding at least one string upon the closed end of each bag, means for indenting the folded string in the closed end of the respective bag, an ejector for successively removing the bags from the holders, a member cooperative with the folded string of each bag as it approaches the ejector to maintain such string in indented position in the end of the respective bag, and means for subjecting each bag to endwise compression against said member prior to its ejection.

22. In a machine embodying a conveyer carrying holders each adapted to hold and advance a bag having draw strings for closing the mouth thereof, means for gripping and drawing the strings of the bags to close them, means for folding one of the strings on each bag across the closed end thereof, means for holding the folded string of each bag in indented position on the closed end thereof during its advance, an ejector located adjacent to said string holding means for successively removing the bags from the holders, and a stamping device for applying a gummed stamp across the closed end and the folded string of each bag during its ejection.

23. In a machine embodying a conveyer carrying holders each to contain a bag having draw strings for closing the mouth thereof, means for drawing the strings of each bag to close the mouth thereof, means for folding a string of each bag across the closed top thereof, stamping means for applying a stamp across the closed end of each bag and the folded string thereof, an ejector for successively removing the bags from their holders and advancing them to said stamping means, a magazine to contain a supply of bags mounted in fixed position at one side of the path of movement of the ejector and having an outlet for discharging bags therefrom in position for advance by the ejector, a member movable transversely in the bottom of said magazine and having a spring for actuating it in a direction to eject a bag from the magazine into the path of said ejector, and means controllable by an attendant for retracting said member.

24. In a machine embodying a conveyer carrying holders each to contain a bag having draw strings for closing the mouth thereof, means for drawing the strings of each bag to close the mouth thereof, means for folding one of the strings of each bag across the closed end thereof, an ejector for removing the bags successively from the conveyer, a stamping device to receive each bag removed by the ejector and apply a stamp across the closed end thereof and folded string thereon, a magazine to contain a supply of bags and having an outlet at a side of the path of movement of the ejector, a member reciprocable transversely in the bottom of said magazine and operative, when actuated, to remove the lowermost bag from the magazine and position it for advance to the stamping device by said ejector, a spring acting to actuate said member, and a pedal connected to said member and operative to retract it and to release it for actuation.

JOHN T. DALTON.